United States Patent
Kravtsov (12)

(10) Patent No.: US 6,462,840 B1
(45) Date of Patent: Oct. 8, 2002

(54) THREE DIMENSIONAL MONITOR AND TACTILE SCANNER

(76) Inventor: Grigory Kravtsov, 2358 Broad St., Yorktown Heights, NY (US) 10598

(*) Notice: Subject to any disclaimer, the term of this patent is extended or adjusted under 35 U.S.C. 154(b) by 0 days.

(21) Appl. No.: 09/550,590

(22) Filed: Apr. 17, 2000

Related U.S. Application Data

(63) Continuation-in-part of application No. 09/312,901, filed on May 17, 1999.

(51) Int. Cl.⁷ .................................................. H04N 1/04
(52) U.S. Cl. ........................ 358/474; 345/427; 382/269
(58) Field of Search ........................... 358/474; 345/31, 345/44, 110, 46, 427; 362/269, 285, 287

(56) References Cited

U.S. PATENT DOCUMENTS 3,555,349 A * 1/1971 Munz ........................... 315/21
5,546,313 A * 8/1996 Asters ..................... 364/468.03
5,717,416 A * 2/1998 Chakrabarti .................. 345/31
6,189,246 B1 * 2/2000 Gorthala ........................... 40/4

* cited by examiner

*Primary Examiner*—Jerome Grant, II
*Assistant Examiner*—Negussie Worku
(74) *Attorney, Agent, or Firm*—Robert N. Blackmon

(57) ABSTRACT

A three-dimensional display system including a method of operating the display as a tactile scanner. A three dimensional display is formed from a number of moveable rods arranged in a matrix. Each rod has selectively illuminated pixels made from LEDs or similar devices. The rods can be moved independent to position the pixels into position to model a pre-defined object to present a three-dimensional model and overlaying image. The pixels can also be illuminated by an external lighting source such as a laser. Stationary embodiments of the monitor are also disclosed which are formed of a three dimensional grid of LEDs or other light sources which can be selectively illuminated to provide a true three dimensional display.

3 Claims, 11 Drawing Sheets

THREE DIMENSIONAL MONITOR AND TACTILE SCANNER

This application is a continuation-in-part of application Ser. No. 09/312,901, filed May 17, 1999, entitled Three Dimensional Input-Output System, which is hereby incorporated by reference.

BACKGROUND OF THE INVENTION

1. Field of the Invention

The present invention is to a three-dimensional monitor and tactile scanner for transmitting, storing, and displaying three dimensional models.

2. Description of the Prior Art

As computers play an increasingly important role in our lives, unlimited numbers of two dimensional displays are presented to us in many diverse forms such as computer monitors, television screens, calculators, and digital watch faces. As computers continue to be integrated into the entertainment industry, many of these displays are built to provide a three dimensional effect by overlapping displays of blue, green and red slightly offset from each other to give a feeling of "depth" to the display. Some devices such as the "Three-D glasses" have been used to project a sense of depth to the screen in a similar manner.

However, there are no commercially viable true three-dimensional displays that can display both the image and contour of an object in real time. The present invention provides a method and apparatus for displaying a three dimensional object, as well as providing a three dimensional display that can be used as a tactile scanner to scan a three dimensional object for display by the same or a remotely connected display. In this way a sense of touch can be transmitted thousands of miles in real time as well as providing interactive modeling over the internet or other networks. Additionally, images stored or created in a computer can come to life in a repeatable and changeable three dimensional presentation.

Attempts have been made in the past to create a three dimensional "picture" by depositing material in successive layers to duplicate the original object, or one created entirely in a computer model. Numerous innovations for three dimensional devices have been provided in the prior art that are described as follows. Even though these innovations may be suitable for the specific individual purposes to which they address, they differ from the present invention as hereinafter contrasted. The following is a summary of those prior art patents most relevant to the invention at hand, as well a description outlining the differences between the present invention and the prior art.

1. U.S. Pat. No. 5,121,329—"Apparatus And Method For Creating Three Dimensional Objects", by Cramp Described in the patent to Cramp is an apparatus incorporating a movable dispensing head provided with a supply of material which solidifies at a predetermined temperature, and a base member, which are moved relative to each other along "X," "Y," and "Z," axes in a predetermined pattern to create three-dimensional objects by building up material discharged from the dispensing head onto the base member at a controlled rate. The apparatus is preferably computer driven in a process utilizing computer aided design (CAD) and computer-aided (CAM) software to generate drive signals for controlled movement of the dispensing head and base member as material is being dispensed. Three-dimensional objects may be produced by depositing repeated layers of solidifying material until the shape is formed. Any material, such as self-hardening waxes, thermoplastic resins, molten metals, two-part epoxies, foaming plastics, and glass, which adheres to the previous layer with an adequate bond upon solidification, may be utilized. Each layer base is defined by the previous layer, and each layer thickness is defined and closely controlled by the height at which the tip of the dispensing head is positioned above the preceding layer.

2. U.S. Pat. No. 5,059,266—"Apparatus And Method For Forming Three Dimensional Article", by Yamane In the patent to Yamane, described is an apparatus and a method for forming a three-dimensional article with photo-setting or thermosetting material on the basis of a three-dimensional information on the article by means of an ink jet method. The material is jetted from at least one ink jet head to a stage and laminated thereon. The laminated material is exposed to light by a light source to be cured. In this process, a jetting direction of the material from the ink jet head to the stage and/or a jetting amount of the material jetted from the ink jet head is changed in accordance with the information by a control unit, thereby forming a solid article having a desired three-dimensional shape.

3. U.S. Pat. No. 5,807,437—"Three Dimensional Printing System", by Sachs

Described in the patent to Sachs is a system for producing three dimensional components by bonding together successive layers of a porous material with droplets of a binder material. A binder printhead has an array of nozzles which controllably supply jets of binder material droplets to the layers of porous material. The printhead is scanned in a raster scan fashion over each layer of porous material along a first scan axis in one direction to provide first fast scanning paths of droplets. The printhead is then moved laterally of such one direction and is then moved along the fast-scan axis in the opposite direction to provide second fast scanning paths of droplets which are interlaced with the first scanning paths. The supply of the droplets to the porous material can be controlled so as to control the overlapping thereof to produce various desired surface and interior characteristics of the components.

4. U.S. Pat. No. 4,814,826—"Printer For Three Dimensional Lenticular Print Material", by Fritsch In the patent to Fritsch, a method of effecting a three-dimensional print by a non-scanned exposure of three-dimensional lenticular print material is provided wherein a lenticular print material and a film having a plurality of exposed frames thereon are placed in opposing imaging planes and a lens and a periscope are positioned between the film and the print material; the periscope including first and second parallel mirrors positioned so as to reflect light along an optical path from the film through the lens to the print material, each of the parallel mirrors rotatable about a first axis normal to the lens optical axis and a second axis intersecting the first axis. Each of the frames is placed a predetermined linear distance from an optical axis of the lens to create a plurality of angular exposure zones corresponding respectively to the plurality of the frames and, for each of the plurality of angular exposure zones; the lens is placed in the center of the angular exposure zone; and the frame corresponding to the angular exposure zone is illuminated for delivering an image exposure of the frame to the periscope along the center of the angular exposure zone; thereby removing the translation (offset of) the image exposure delivered to the periscope from the lens along the center of the angular exposure zone from the periscope to the print material by rotating the periscope about the first axis and rotating the periscope about the second axis to restore the optical axis path to its original length.

5. U.S. Pat. No. 5,753,344—"In-Line Printing Production of Three Dimensional Image Products Incorporating Lenticular Transparent Material", by Jacobsen The patent to Jacobsen provides a method of producing in a single in-line process a printed image suitable for creating an illusion of depth in the perception of a viewer of the image, comprising the steps of: (1) providing an opaque web to an in-line printing process, (2) providing a transparent web to the in-line printing process, the transparent web having a lenticular surface on one side and a flat surface on an opposing side, (3) transporting either the opaque web or the transparent web to a first printer unit of the in-line printing process at a pre-selected speed and printing a lineformed image on the opaque web or the flat surface of the transparent web, the lineformed image being compatible for viewing when viewed through the lenticular surface of the transparent web, and (4) setting the image on either the opaque web or flat surface of the transparent web in a heat setting unit of the in-line printing process.

6. U.S. Pat. No. 4,929,402—"Method For Production of Three Dimensional Objects by Sterolithography", by 1-Iull In the patent to Hull, described is a system for generating three-dimensional objects by creating a cross-sectional pattern of the object to be formed at a selected surface of a fluid medium capable of altering its physical state in response to appropriate synergistic stimulation by impinging radiation, particle bombardment or chemical reaction, successive adjacent laminae, representing corresponding successive adjacent cross-sections of the object, being automatically formed and integrated together to provide a step-wise laminar buildup of the desired object, whereby a three-dimensional object is formed and drawn from a substantially planar surface of the fluid medium during the forming process.

Unlike in the patents referenced above, the present invention includes the usage of a three dimensional printing device that is suitable for telemanufacturing purposes, wherein digital files containing "x", "y" and "z" coordinate information may be sent to the printing device remotely.

None of the above inventions and patents, taken either singly or in combination, is seen to describe the instant invention as claimed.

SUMMARY OF THE INVENTION

The current invention discloses a method and apparatus for displaying a three dimensional image and for using the same display as an input scanner device for scanning an object to be displayed later or at a remote device. The display presents both a three dimensional image by providing color elements along a three dimensional grid, but also a three dimensional display that can present a touchable, concrete image three dimensional image that can be changed in real time.

In a first embodiment, a rectangular grid of pins is connected to a control circuit to move the pins independently of each other to form a predetermined contour based on an input signal. The pins can move in at least one direction to approximate the shape of an three dimensional object described in a digital file ("digital image"). The pins also contain an array of lighting elements such as LEDs or fiber optic lights to present an accurate color image of the object being displayed. The combination of the three dimensional contour and color display in the three dimensional grid for a three dimensional replication of the original object in real time. The display can be viewed to appreciate the three dimensional character of the display, and can be touched and felt to provide tactile feedback to the viewer.

By including appropriate sensors in the pins at the ends or along the bodies, the three dimensional display can also act as a tactile scanner. The pins may include force sensors, brightness or color sensors, general light sensors, and position indicators to scan the properties of an object in contact with or near the scanner. The information sensed by the scanner can be written to a digital file or transferred by analog or digital means to a storage location or to a remote three dimensional display for presentation to another viewer to provide three dimensional communication.

The display can be covered in a latex or similar material to enhance the sense of feel to the display. The cover material also provides a moisture and dust barrier to the device and can be used in conjunction with the light sources to enhance the display. In a preferred embodiment, the sense of feel is further enhanced by providing the pins with an adjustable hardness that can be controlled by the signal to further enhance the tactile response by the viewer. The temperature of the individual rods can also be controlled in response to a control signal by electrical heating or cooling of the elements to further enhance the tactile response.

In a second embodiment, a three dimensional display is formed as a stationary display capable of providing a three dimensional display. A cube, sphere or other regular or irregular geometric shape is provide with a grip of fiber optic cables grouped together in parallel to fill the entire space of the display. The cables are transparent and have along their lengths display points to create a three dimensional grid of "pixels" which are capable of presenting a particular color and brightness at each pixel. The geometric display can thus present a three dimensional object by coloring each pixel within the three dimensional grid to show both the contour and color image of the object to be displayed without any moving parts.

In a third embodiment, the fiber optic cable pixels are replaced by a three dimensional grid of LCD or other light emitting devices fixed in a glass or other transparent medium. By applying an electric signal to the "pixels" formed by each LCD, the display forms a three-dimensional monitor capable of showing both the contour and color properties of the object.

Accordingly, it is a principal object of the invention to provide a three dimensional display that can simulate the contour and texture of a image from a digital representation of that object.

It is another object of the invention to provide a three dimensional display that had a number of moveable display elements that can be arranged to present a contour, shape, and image of an object in three dimensions.

It is a further object of the invention to provide a method of displaying a three dimensional object defined by a computer readable signal in three dimensions to display not only a visual image in a three dimensional grid, but to also selectively imbue the display with the properties of hardness, temperature, and feel of the object.

Still another object of the invention is to provide a three dimensional scanner for determining the size, shape, feel, temperature, color, brightness, and hardness of an object and storing the characteristics in machine readable form for later recall or transmission to a remote user.

It is an object of the invention to provide a stationary three dimensional display having a fixed grid of pixels in three dimensions for displaying an image.

It is an object of the invention to provide a method of scanning an object at a remote location to determine not only the image of the object, but also the hardness, temperature, contour, shape and size of the object for broadcast to a remote three dimensional display over a network.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT(s)

The present invention relates to a method and apparatus for displaying an object from a digital signal defining the object and tactile scanner therefore.

In order to facilitate the distinction between actual and real images and objects, the term "original object" or "object" will refer to a three dimensional physical object that is being modeled. The object can be scanned into a computer or other machine by appropriate CNC devices or other means, or can be created and defined solely by a computer using a CAD program or other software to model the object.

The machine readable definition of the three dimensional object will be referred to as a "digital signal" or an "digital signal definition." One skilled in the art would recognize that the digital signal could be analog or any other machine readable code or signal.

The term "image" refers to the visual appearance of the object or its broadcast by color or light elements in two or more dimensions.

The three-dimensional structure that results at the printer or display will be referred to as a "model" of the original object.

Figure 1:
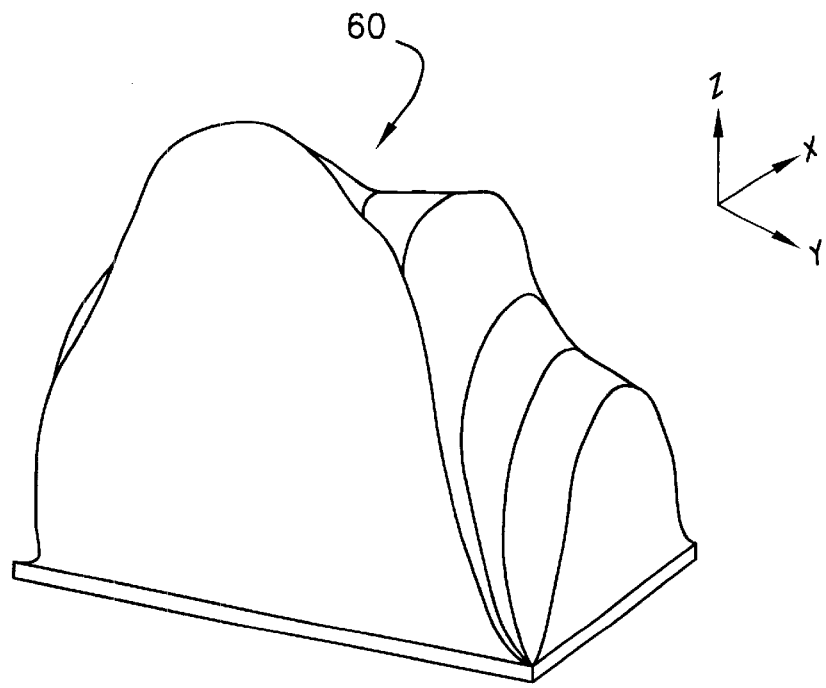
FIG. 1 is a perspective view of a sample object to be modeled.

FIG. 1 shows a sample three-dimensional object 60 to be scanned by the system and transferred to a remote user or stored for later recall on the same computer. The object 60 has a certain topography or contour which characterizes the shape of the object. In the simplest three dimensional model presentation, we can define the object by measuring and recording the differences in its height in one direction such as the z axis and record those measurements along with the color and brightness of the object at each measured point. If we can reproduce on a three dimensional display a display element at the proper height along the object and illuminate the display element with the proper color and brightness, then we can accurately present a model of the original object with a great deal of useable information about the original object to the viewer.

One embodiment of a display capable of presenting this information is shown in FIGS. 3 through 7, as will be described herein. The first embodiment of the invention describes a real time method of displaying not only the image of the object, but also its contour and shape and other features in real time in a format that can be changed and altered to display multiple sequential models or a model in motion.

Figure 3:
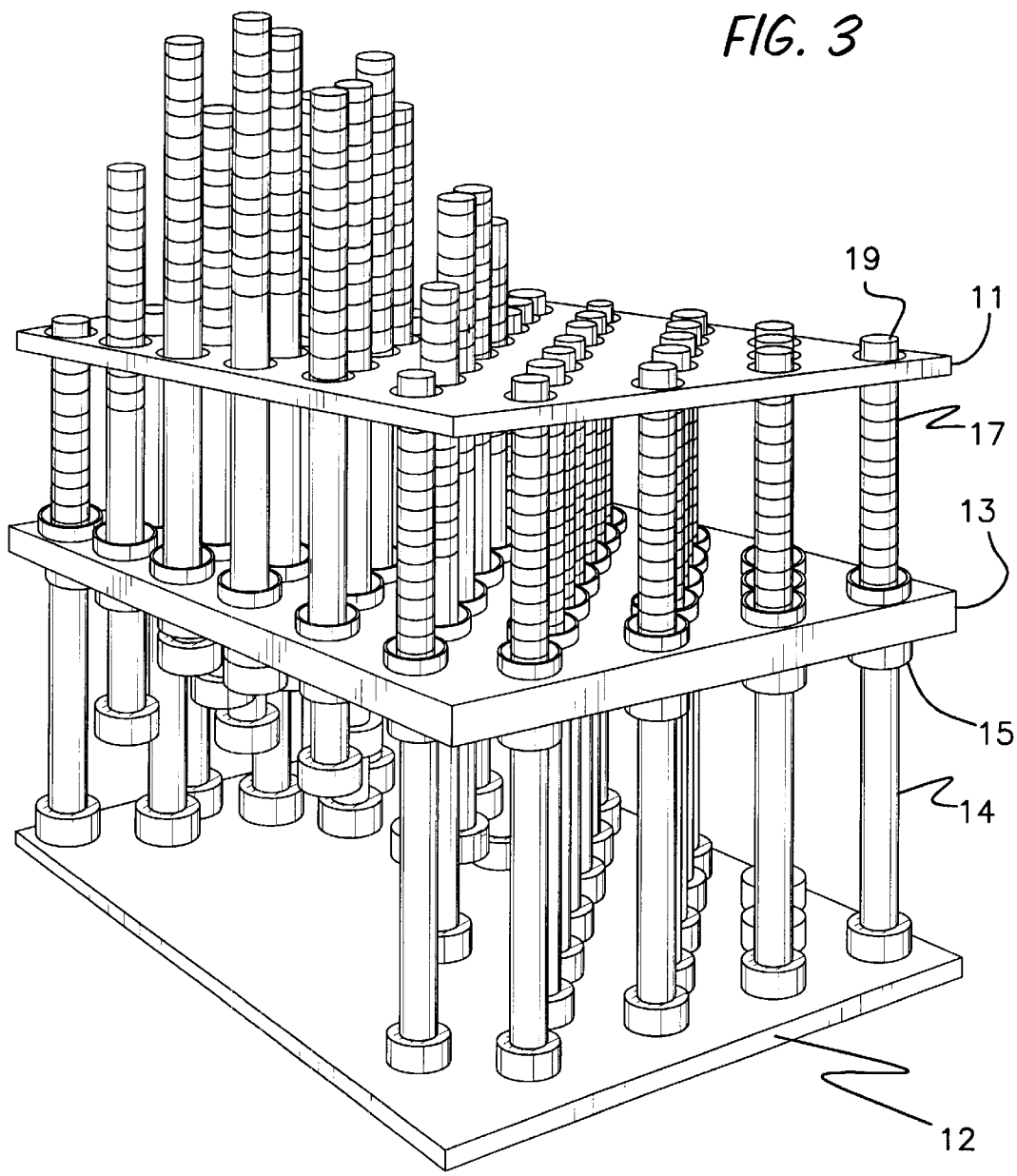
FIG. 3 is a perspective view of a three dimensional display and scanner according to a second embodiment of the invention.

As shown in FIGS. 3 through 7, a three-dimensional display unit 62 includes a plurality of rods ("display elements") 14 as shown in FIG. 3. The display elements are cylindrical in shape and spaced closely together to form a matrix of six rows by four columns with each alternate row offset for maximum fill in. This shape is shown by way of example only and could be arranged in any number of rows, columns, or other geometric patterns to provide the desired resolution and spacing of the display elements. The number of rows and columns and the spacing should be determined by the accuracy needed ("resolution") and the computing power available. One skilled in the art would recognize that the thinner the rods are made and the closer they are spaced together, the more accurate representation can be made of the original object. By expanding the total number of rows and columns, larger objects can be modeled (see FIG. 11). For the sake of clarity, only a limited number of display elements are shown with substantial spacing shown between the rods.

Figure 10:
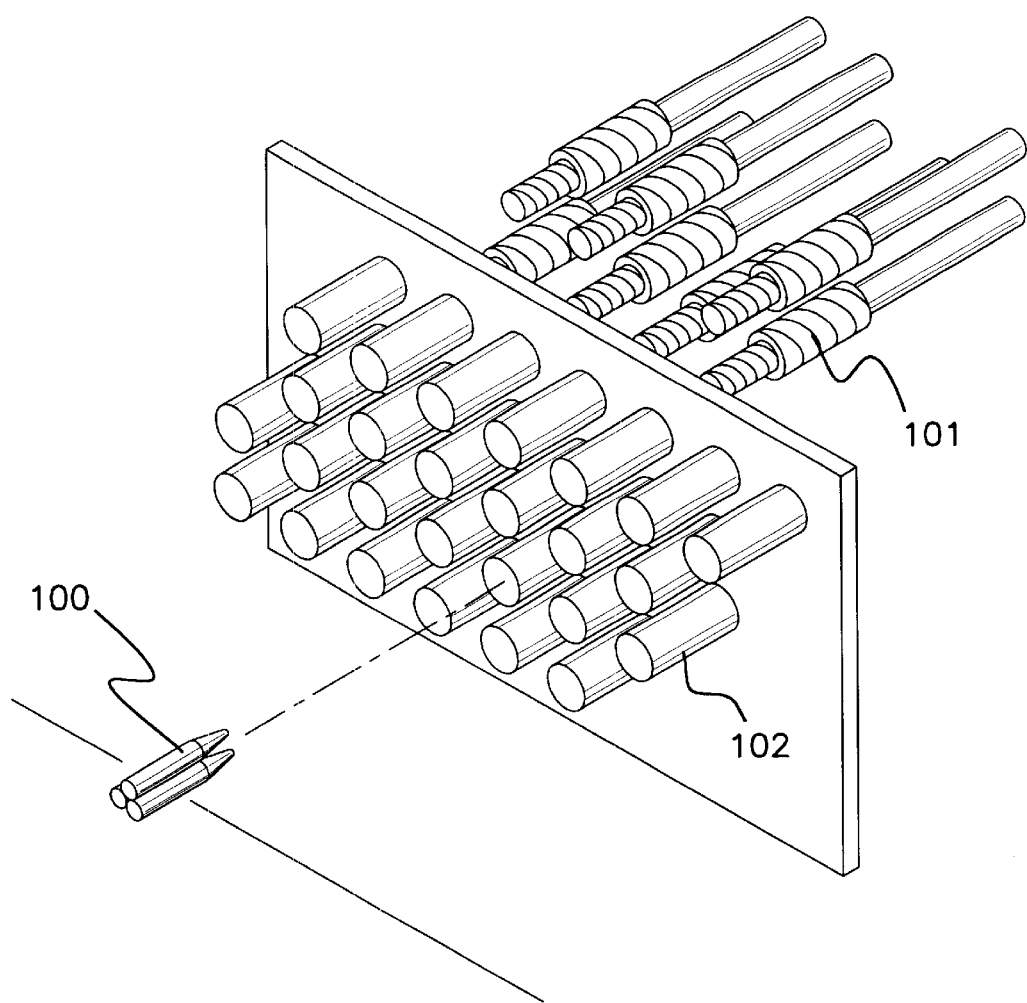
FIG. 10 shows an external laser lighting system for use with the current invention.

As shown in the FIG. 10, an object 60 such as that shown for example purposes only is scanned into a computer 80 or created entirely within computer software in the form of a digital signal 82 or computer readable code. The digital signal is transmitted 84 over the internet, over a network, or by hardwire or other means to the display 62. The digital signal 82 preferably contains information on the object indexed by Cartesian coordinates of points along the surface contour of the object 60 in the x, y and z planes.

Figure 2:
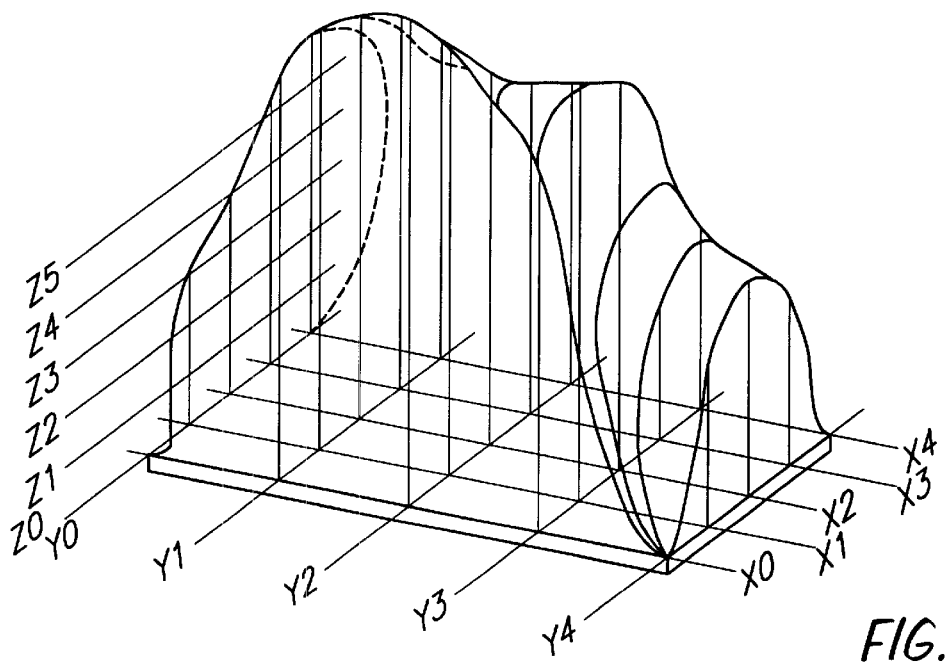
FIG. 2 is a diagrammatic view of the model of FIG. 1 divided into discrete elements for measurement.

The object can thus be divided into discrete segments ($x_n$, $y_n$) as shown in FIG. 2 and measurements taken at regular intervals ($x_1$, $y_1$), ($x_2$, $y_1$), ($x_3$, $y_1$) ... to determine the height of the object ($z_n$) at each point as shown in FIG. 2 to model of the topography of the object. By graphing these points in three dimension on the output display, a model of the original object can be reproduced with the same accuracy ("resolution") as the original scan or definition.

Figure 4:
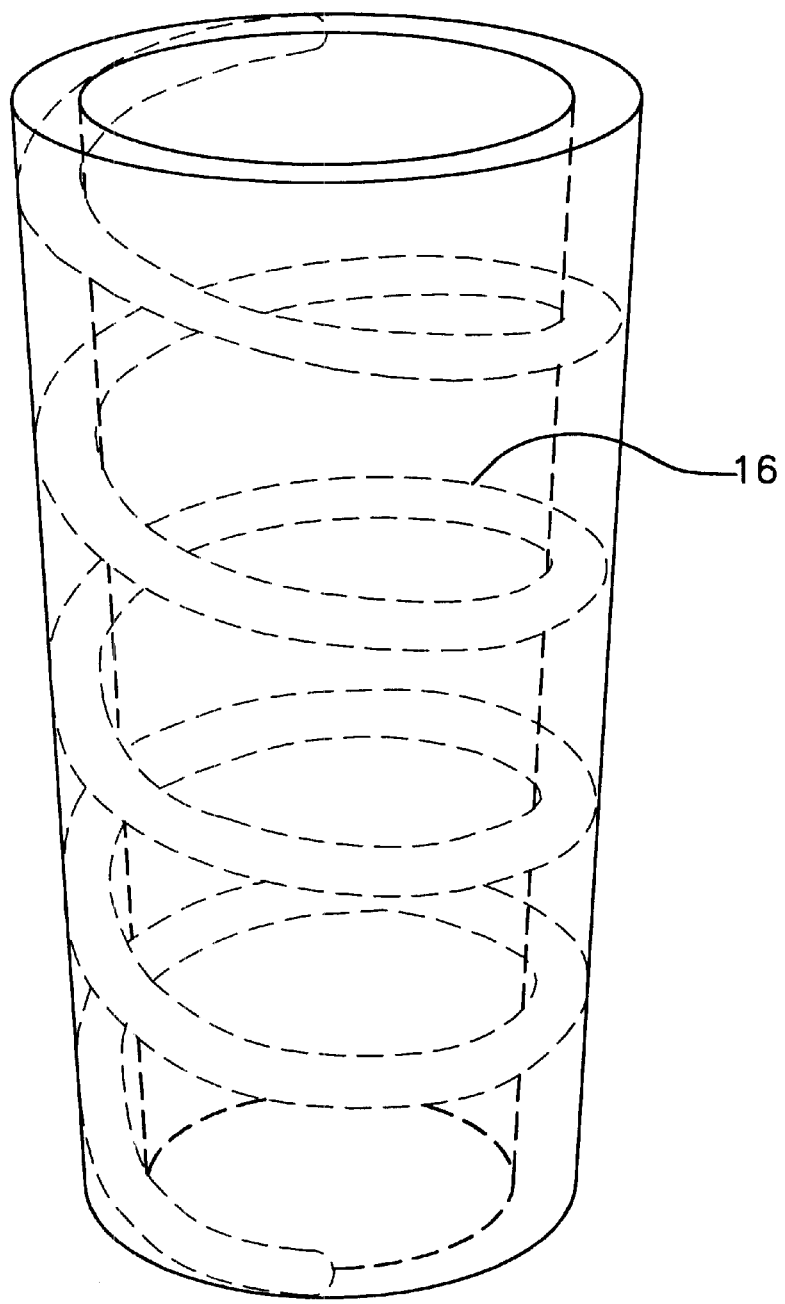
FIG. 4 is a perspective view of a inductive coil for use with to the invention.
Figure 5:
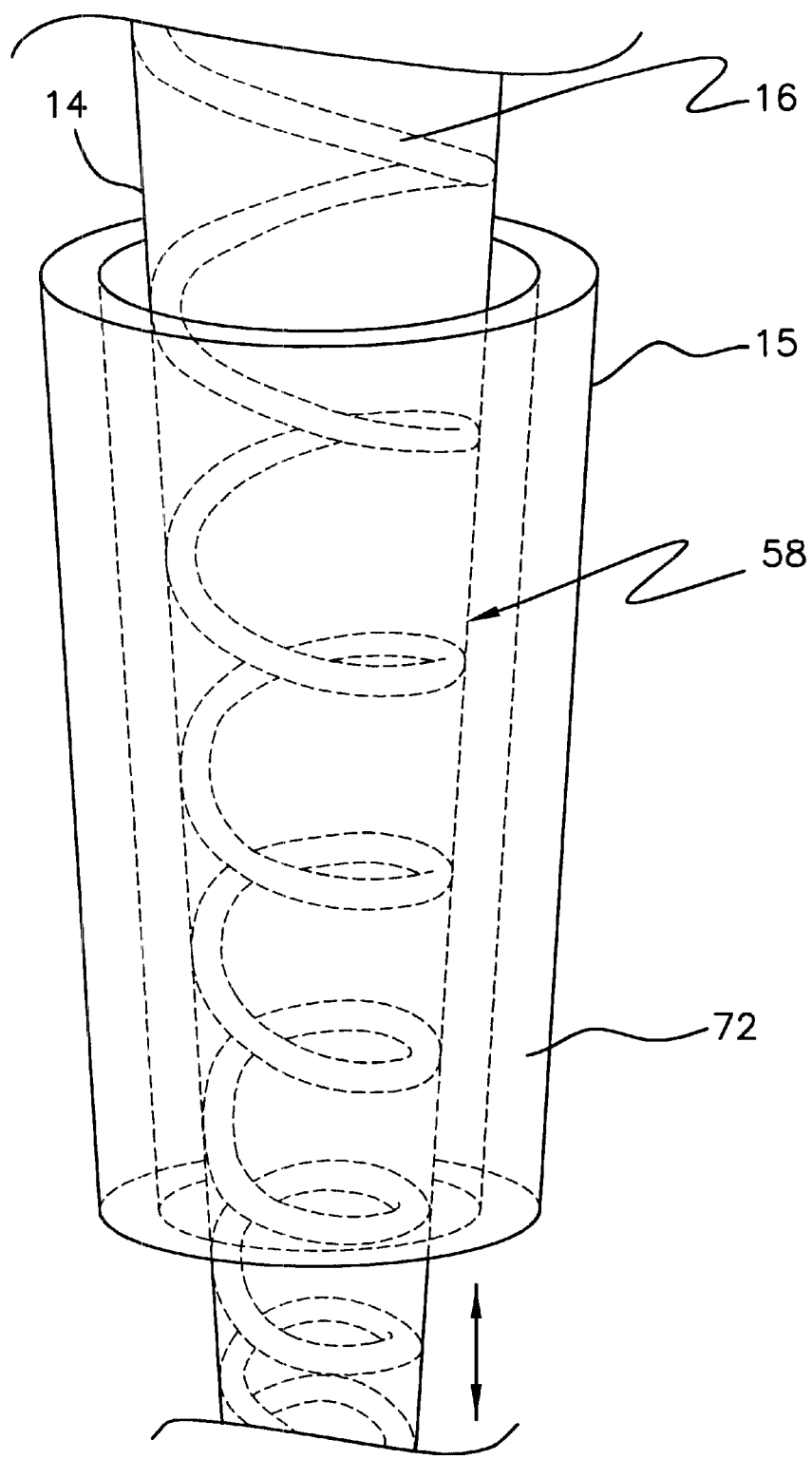
FIG. 5 is a break out view of the lower end of a display element and motion controller according to a second embodiment of the invention.
Figure 8:
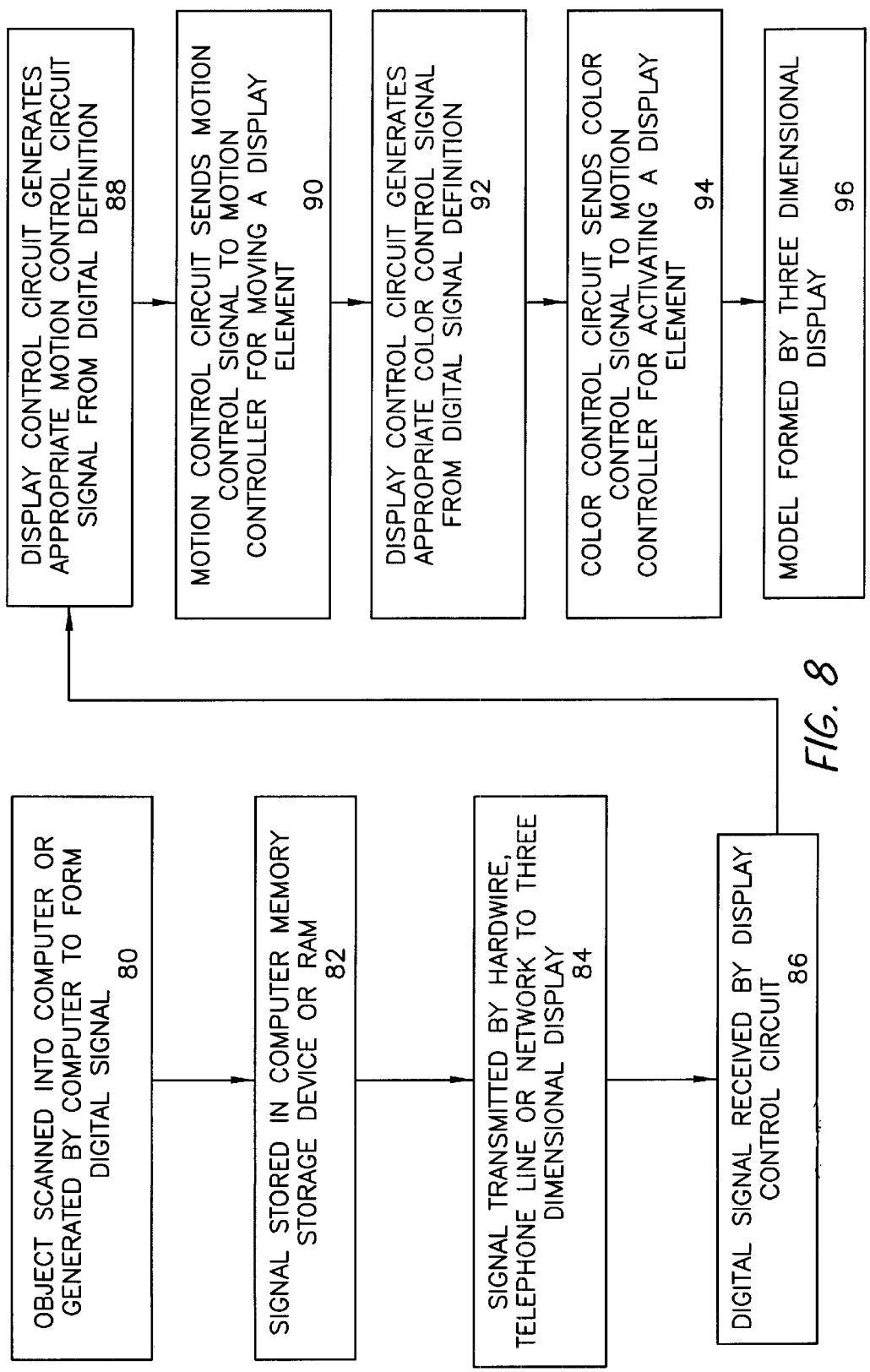
FIG. 8 is a flow diagram showing a method of displaying a three-dimensional object according to the invention.

To graph the model, display elements 14 (FIG. 3) are provided on a main body 63 which are moveable independently along at least the z-axis (FIG. 3) in response to a motion control signal 80 (FIG. 8). The lower portion of each display element 14 is provided with a motion controller such as an inductive coil as shown in FIGS. 4 and 5 for moving the display element 14 up or down to a predetermined position. One skilled in the art would appreciate that the method of moving the display element 14 can be chosen from any number of electrical and mechanical devices to achieve the same purpose including cams, stepper motors, piezoelectric devices and other such motors and devices. A computer controller such as a display controller 86 (FIG. 8) on the display receives the digital signal 80 and generates a motion control signal 88 which is sent to a motion control circuit 90 (FIG. 8) to energize the outer inductive coil (FIG. 5) to cause a display element to move to a predetermined location.

Each display element can be independently controlled to arrange the display elements into a certain pattern to present a contour of the original object. Because the digital signal includes measurements of the height (z) at each change in x and y, the grid of rods can be used to reproduce the shape. Each rod in a row is assigned a particular x value, and each rod in a column is assigned a particular y value. The height of each rod is then set by the motion controller to the height z appropriate for the particular rod coordinate (x, y). After setting each rod to the correct height, if there are a sufficient number of rods and the spacing is set to produce an appropriate resolution (e.g. 0.5 mm spacing), then the display will accurately produce a model representing the original object (FIG. 3). A display control circuit on the display receives a display control signal 92 (FIG. 8) from the display control circuit (86) in response to the digital signal received by the display control circuit. The display signal contains the illumination data for each display element and luminescent display to turn on the appropriate LDs 18, 19 and color the display to the correct color 94 (FIG. 8) to display a three dimension model in the appropriate color image 96.

Figure 11:
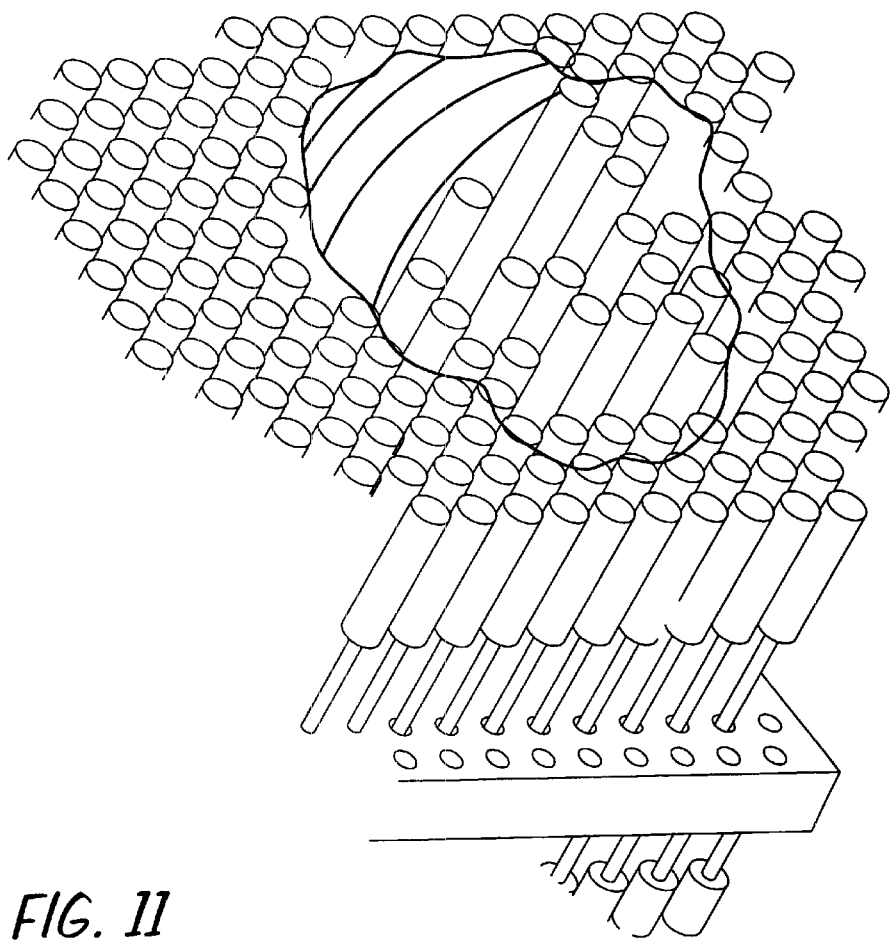
FIG. 11 shows a large array of display elements for displaying an object in higher resolution according to the present invention.

As the number of display elements is increased and the size and spacing of each display element is decreased, the accuracy of the entire display will continue to increase until the model approaches the exact shape of the original object. (FIG. 11)

Figure 7:
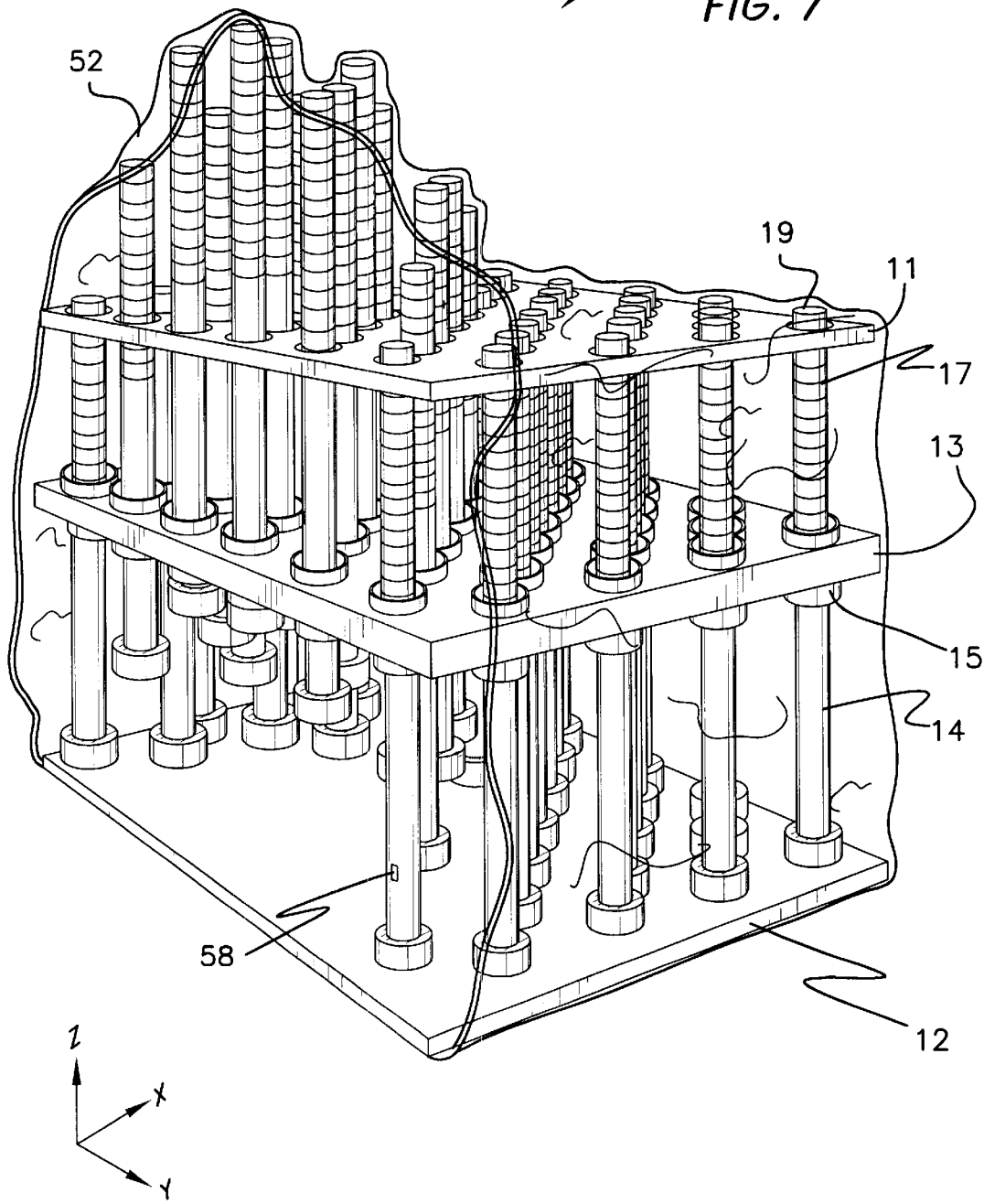
FIG. 7 is a partial break away, perspective view of a three dimensional display wrapped in a protective covering according to the second embodiment of the present invention.

As shown in FIG. 7, the entire display can be wrapped in a latex or plastic covering 52 to provide additional surface area on the display to further accurately model the original object. The latex covering can be attached to each individual display element or the covering can be attached solely about its periphery by adhesive or other known methods. The covering, while shown in FIG. 7 in partial break away for clarity, preferably covers the entire display device to provide a moisture and dust barrier to protecting the display components. The latex also provides an improved feel to the display such that the user can actually touch and feel the surface and contour of the display to provide tactile feedback as to the shape of the object.

Figure 6:
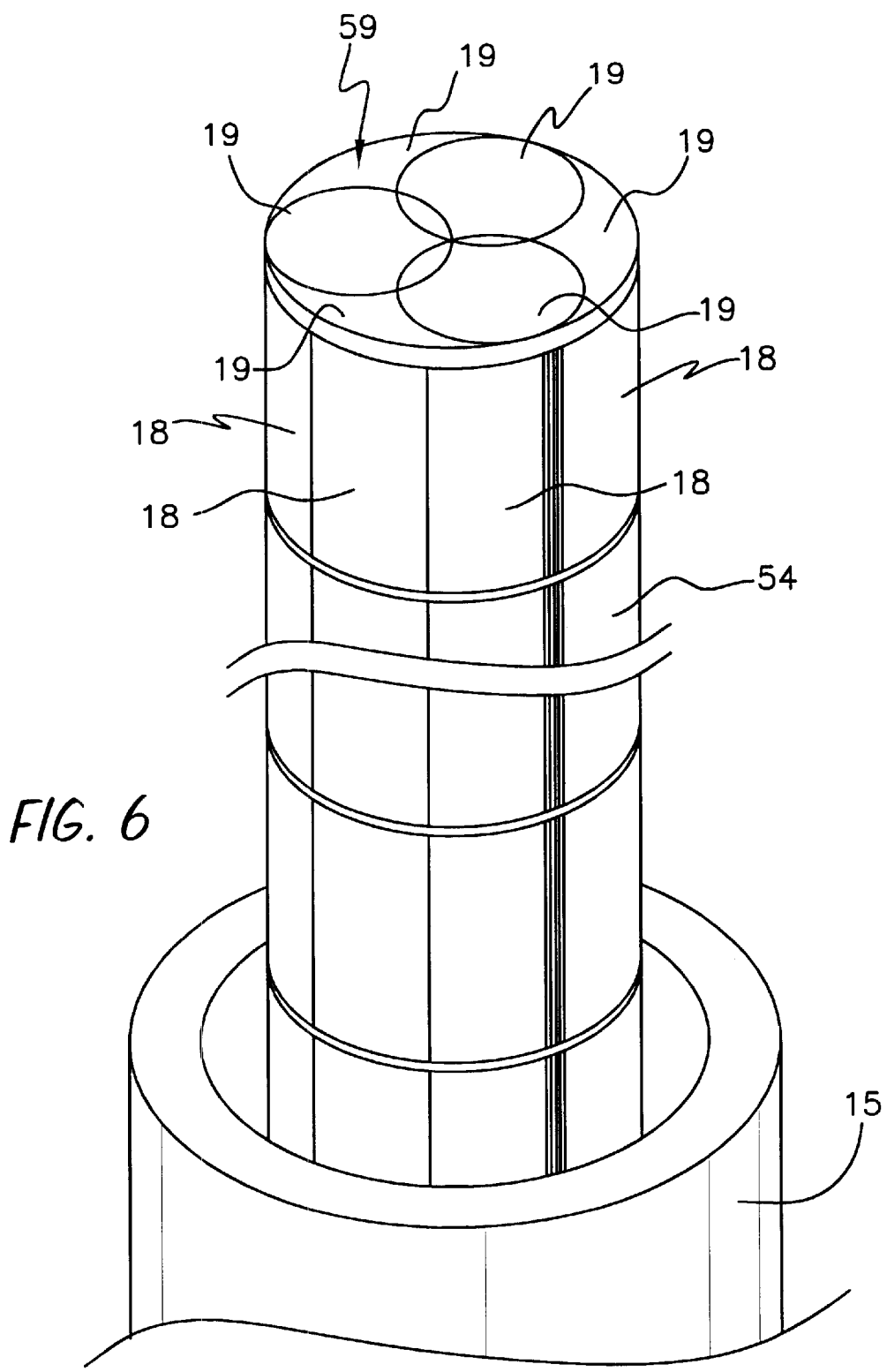
FIG. 6 is a perspective, break out view of a display element according to the second embodiment of the invention.

In a preferred form, the individual display elements in addition to moving to simulate the shape of the original object also provide additional sensory feedback to the user. The first sensory feedback is sight. Each display element is provided with a luminescent display ("LD" or "pixel") as shown in FIGS. 3 and 6. The LDs 18, 19 can be provided at the top or along the body of the display element.

As shown in FIG. 3, each LD can be composed of three separate Red Green Blue ("RGB") elements to provide a composite color display or one multi-color LD can be used instead. The LD could also illuminate in only black and white, but is preferably color capable. Any number of light emitting diodes or photo units or Cathode Ray Tube (CRT) or fiber optic devices could be used to present a point of light of the correct color and intensity depending on the application.

Each LD provides one pixel in the overall image presented by the three-dimensional display. By moving the display elements 14 into proper orientation and position (x,y,z), both the model of the object with its particular shape and contour can be presented along with an overlaying image on the top and periphery of the model to present a three dimensional model which is sized and shape appropriately and also appears to take on the look and brightness of the object modeled. The combined dimensional and visual representation provides a much better representation of the object to the viewer than a two dimensional display.

In the preferred embodiment, only the LDs which are exposed along the outer periphery of the modeled surface are illuminated. Therefore all end LDs are illuminated, but only the particular side or body mounted LDs are illuminated if they form part of the contour (e.g., extend further than the next closest, facing display lo element). According to this mode all end LEDs are illuminated, but only body mounted display elements are illuminated if they are higher (greater z value) than the next closest display element on the same side.

It is also foreseeable that all of the display elements could be illuminated to present a "CAT scan" like image of the object. In this case if display was showing a model of a human head, the display would extend to the contour of a head, while the end LDs showed an image of the outer skin of the head and the body LDs displayed the brain and blood vessels in the brain. In this way, by manually lowering a portion of the display elements, the next visible display elements would show a "cross-section" of the object at that position. One skilled in the art would recognize the enormity of the usefulness of a display of this type for teaching and diagnostic purposes.

Additional sensory display elements can be incorporated into the display to add to the overall value of the model and the tactile feedback provided to the user. Electrical heating elements 54 can be provided along or within each display element 14 to provide a sense of temperature to the object for tactile feedback or for diagnostic purposes. The display elements can be made out of a plastic material and incorporate materials along the periphery 54 which are hardened, stiffened, or softened by electrical impulse to provide additional sense of feedback to the viewer. Alternatively, the motion controller can cooperate with the magnetic coils to provide a predetermined amount of resistance to pressure on the display elements to provide a sense of rigidity of the object modeled.

Preferably, the display also acts as an input device for recording or scanning a device to create a digital signal which defines an object. By providing sensors 58 in cooperation with the inductive coils, the movement of the display element rods can be converted to a scanning signal. The location and motion of the rods along with the amount of force on the rod can be determined by the sensors 58 and converted to an electronic signal for transmittal to a computer processor. Additionally, the brightness, color, temperature, and resiliency of each area of an object contacted by the rods can be measured by an appropriate sensor 59. An aggregation of each of the sensor's output can be used to define an object if there are sufficient sensors spaced an appropriate distance apart to measure the object with sufficient "resolution." The data can be assembled to form a digital signal defining the object's size, shape, color, temperature, and hardness.

In operation an object such as that shown in FIG. 1 is placed on top of the scanner (or the scanner can be lowered onto the object). Each probe will be displaced a certain amount depending on the height of the object at that particular point. The amount of displacement at each location can be recorded using Cartesian coordinates as discussed above to identify the appropriate height (z) at each point according to the row (x) and column (y) of the scanner (FIG. 2). The information can be assembled into one or more computer readable documents (digital signals) for later transmittal, display, or storage. Additionally, for each coordinate (x,y) or (x,y,z), an additional piece of data can be attached for later reference and display. The additional data may include the other sensory data discussed above such as the temperature, hardness, brightness, color, or a combination of these.

In a preferred application, the display is used to remote broadcast an object in real time over the internet or other network. As best shown in FIG. 7, an object to be transferred is scanned in by using the display in its capacity as a scanner. It is envisioned that the scanner and display can be used as a personal communication system between to remote persons. By pressing one user's face against the scanner, the face of the user is broadcast to the remote user in both base relief and image. Tactile feedback can be enhanced by using the display simultaneously as a scanner and a display such that the second user can touch the display showing the face of the first user, for instance, and transmit the "feel" of that touch to the face of the other user. It is here that the sensors transmitting the temperature, hardness, and force of the users "touch" back to the first user hint at the importance and quantity of additional information that can be carried over the present system. The ability to reach out and actually touch a remote user is achievable by the present system in a way that was not practical by two dimensional "visual" monitors. In this way the display not only transmits the image of an object, but transmits "touch." Additionally sound information could be attached to the file or transmitted in parallel to the digital signal for two way communication.

Additionally, if the display is used as both a display and a scanner, then an object displayed on the display can be manipulated by manually moving display elements to provide interactive modeling or dynamic sculpturing of the model. A user at one remotely connected terminal can display his version of the model, and a user viewing the display at a second terminal can manipulate the model to add corrections or suggestions. Iterations of this interactive manipulation of the display can be used to provide input from different parties at remote locations on the same object.

Figure 9:
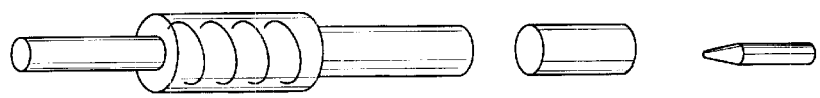
FIG. 9 is an exploded view of a display element and lighting system therefore for use with the first embodiment of the invention.
Figure 12:
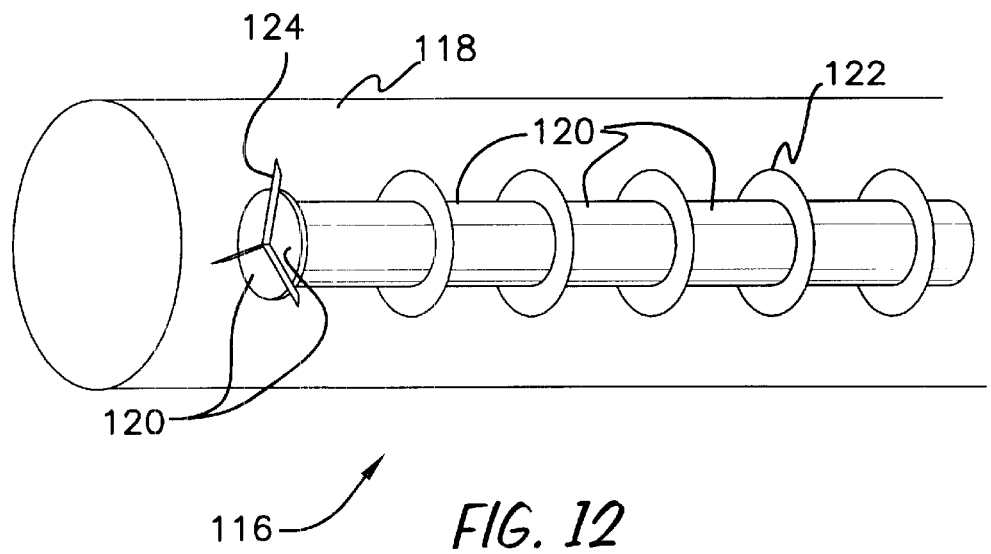
FIG. 12 shows a light system including a vacuum tube for use with the present invention.

As shown in FIGS. 9, 10 and 12, alternative means other than LED and photodiodes can be used to illuminate the LDs 18, 19 of the display elements 14. One such method is an external laser 100. A group of three lasers 100 is shown directed to a stationary collector 102 which focuses and channels the light in a fiber optic display element 114. The display element 114 is preferably transparent. One skilled in the art would also appreciate that the display element could be solid or a hollow tube. The light is then transmitted to an LD 18, 19 for display. The stationary display 102 may consist of one channel for connecting to one LD, or may have several conduits for distribution to various LDs within one display element 114. The laser may be directed to a particular stationary collector by appropriate means including movable mirror, lenses or other means. As shown in FIG. 9, an individual laser or group of lasers may be provided for each display element 114 or for a small group of display elements 114.

As shown in FIG. 12, a moving vacuum tube display element 116 can be used in place of the fiber optic display element 114. In this case, a transparent glass vacuum tube 118 surrounds a color plasma display having a red, green and blue phosphor elements 120 for displaying colors. Barriers 122 are provide for separating or collecting the different color areas. In addition to divisions of color axially, the upper barriers 124 divide the tube radially into three separate color zones of red, green and blue.

Figure 13:
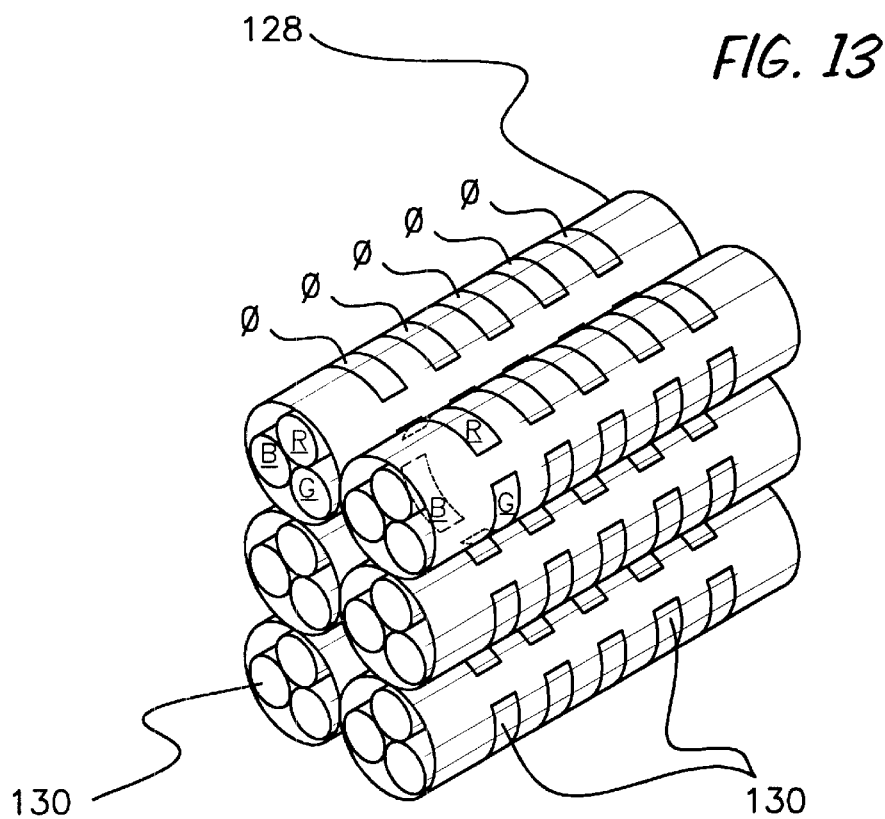
FIG. 13 shows a perspective view of a third embodiment of a stationary display having a three dimensional display capability.

In a second embodiment of the invention, a stationary display capable of displaying in true three dimensions is disclosed. FIG. 13 shows a number of representative optical rods 128 which are fixed relative to each other. The rods are transparent and each contain a number of LEDs 130 or other illuminating elements along the body and top of the rod. The LEDs are preferably wired with transparent conducting wire that is know to those of ordinary skill in the art. In this way the LEDs make up a grid of pixels ("light elements") that are fixed in a transparent medium formed by the optic rods and wiring elements. If necessary additional plastic material can be added between the elements to provide for more consistent transmission of light throughout the entire stationary display. A grouping of the individual optic rods 128 form the three dimensional display. Preferably the rods are arranged in parallel bundles similar to the display elements of the first embodiment of the invention to form a complete display.

In distinction to the moveable three dimensional display described above, the current device uses a fixed three dimensional grid of lighting elements 130 to display in three dimensions. The digital signal 80 providing the definition of the object to be displayed contains information on each point in the contour of the object 60 as described above. Instead of moving the display element 14 as discussed above to move an LD 18, 19 into proper position to display a point on the contour of the object, the stationary device already has an LED 130 in any position required within the bounds of the device. Similar to the first embodiment, each rod 128 is assigned a particular x,y coordinate based on its location within the display. The display control circuit transmits the z value for the particular control rod and illuminates an LED 130 at the particular location to color and define the surface of the object to be modeled. Because the grid is made of a three dimensional matrix of pixels, a true three dimensional image of the object is displayed. In addition to displaying lighting elements along the surface of the object, a cross section of the object at any particular point could also be displayed as discussed above.

Figure 14:
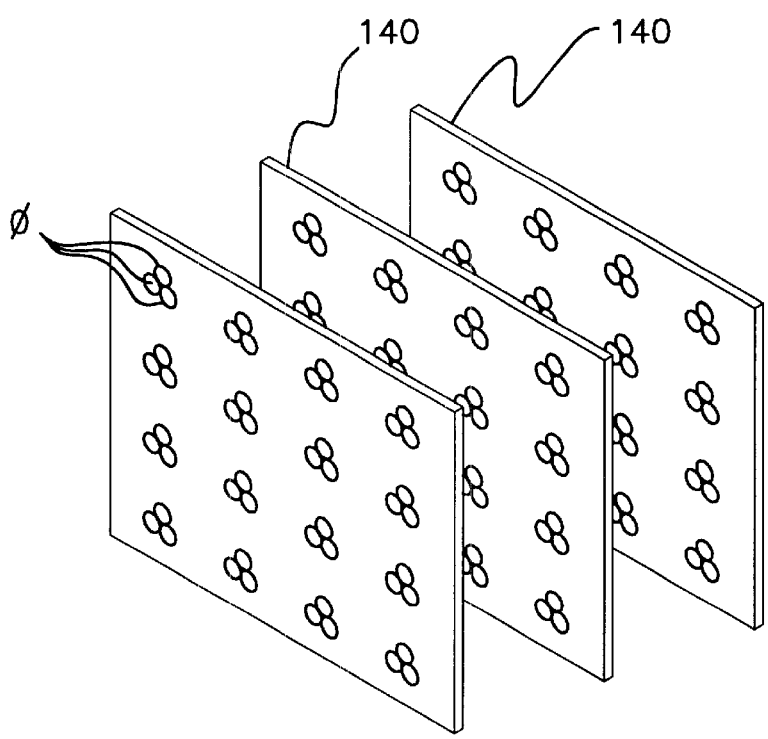
FIG. 14 shows a perspective view of a stationary display according to a fourth embodiment of the invention.

A third embodiment of the invention is shown in FIG. 14. In this embodiment the display is formed of a number of transparent panels 140 of LED lights 142 capable of displaying red, green and blue pixels in rows and columns across each panel 140. When the panels are mounted together, a three dimensional matrix of pixels is formed capable of displaying a three dimensional model of an object. The display utilizes transparent wiring as discussed above to further enhance light transmission through and out of the display. The LEDs 142 are sized and made be constructed so as to minimize disruption of light flow through the display. In this way an object can be displayed by displaying the contour of the modeled object at the appropriate LED location as discussed above in a near hologram fashion. Through appropriate software, the model can be rotated or cross-sectioned, etc. to increase the diagnostic and educational value of the model.

Figure 15:
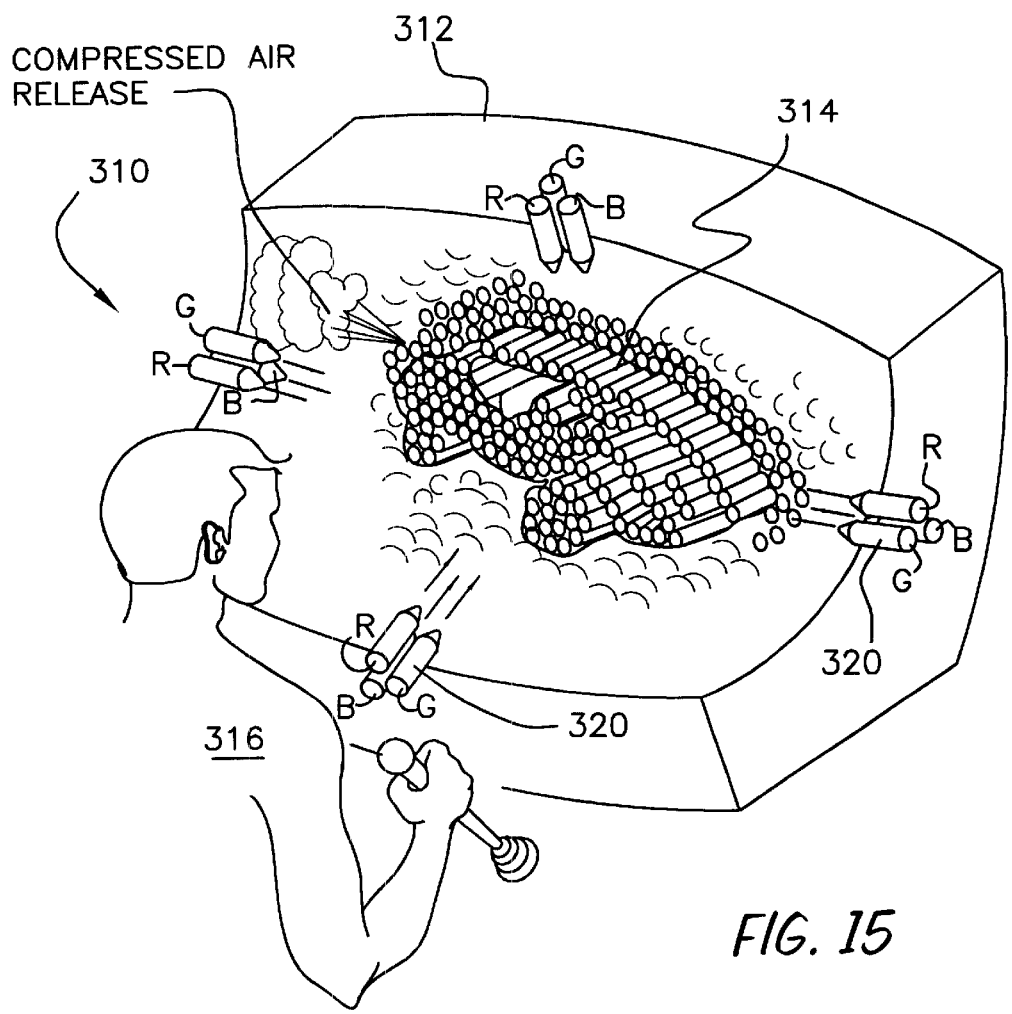
FIG. 15 shows an environmental, perspective view of a fifth embodiment of the invention having a vapor control system.
Figure 16:
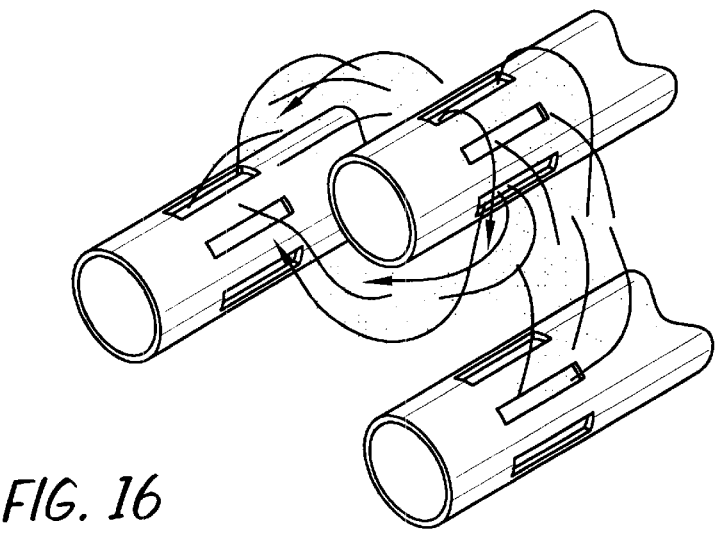
FIG. 16 shows a break out view of a vapor jet according to the fifth embodiment of the invention.

FIGS. 15 and 16 show an alternative embodiment of a three-dimensional display having a controlled vapor system. A three-dimensional display is shown as a video game. A standard video game case 312 is shown for housing the display. A number of moveable display elements 314 are shown moveable toward and away from the user 316. The rods 314 are programmed to simulate a three-dimensional object such as a vehicle as shown in FIG. 15. by moving the rods independently to the contour of the model as discussed above. However, in this embodiment the display elements do not contain lighting elements in the rods themselves and therefore are not required to be made of transparent materials. Instead a number of external lighting elements 320 are provided around the case 312. The lighting elements 320 are preferably lasers which can be focused on a particular area by moving the lasers or preferably by cooperating mirrors (not shown). By selectively directing the light on the appropriate display elements 314 the three-dimensional display can include an overlapping image of the object to enhance the appearance of the three-dimensional display. The lighting elements 320 preferably include red, green and blue lights to provide the display with the full spectrum of colors when needed. The display elements may extend far enough to contact and interact with the user or may be enclosed within a transparent display to protect the system.

To enhance the display further, a novel vapor control system is included to increase the over all appearance of the display. Each of the display rods 314 is provided with vapor vents. The vapor vents 322,324 are provided in two different categories - vapor release vents 322 and vapor suction vents 324. The control rods 314 can be provided with vents that are constructed to have designated vents 322 that only expel vapor and other vents 324 that always suction vapor, or the vents may have a control system that determines whether a particular vent will expel or suction vapor depending on the needs of the system.

As shown in FIG. 16, the top most display element 314 is releasing a controlled amount of vapor to the environment around the display element through vents 322. Cooperating display elements vents 324 provided at the bottom of FIG. 16 withdraw vapor at a matched rate to the release of the vapor to provide a fixed amount of vapor in the display area. The vapor, which is preferably steam, acts as a dynamic screen to reflect the light from the lighting elements 320. The cooperating display elements 314 and vapor screen 326 enhance the resolution and overall quality of the three-dimensional display and provide an enhanced three-dimensional effect to the display. The case 312 may be sealed to contain the vapor or open to enhance the effect of the vapor.

It is to be understood that the present invention is not limited to the sole embodiment described above, but encompasses any and all embodiments within the scope of the following claims.

I claim:

1. A three dimensional display system for displaying an image from a digital signal, comprising:

a plurality of display elements linearly moveable parallel to a first axis;

means for moving at least one of said display elements in response to the remotely broadcast signal a predetermined distance and direction parallel to said first axis to create a representation modeling said image to provide a three dimensional representation of said image.

2. A three dimensional display system for displaying a representation of a three dimensional image from a digital signal, comprising:

a grid of display elements linearly moveable about a first axis; each of said display elements having a cylindrical, elongated body including a plurality of multi-colored light emitting side elements along the elongated body and a plurality of light emitting top elements at a first end of said elongated body;

an electro-mechanical coil about a second end of each of said plurality of elongated bodies for moving said elongated bodies a predetermined distance and direction parallel to said first axis;

a control circuit for receiving the digital signal and transmitting a corresponding motion control signal to said electro-mechanical coil to energize said coil to move said plurality of elongated body said predetermined distance and direction parallel to said first axis;

a color control circuit for receiving the digital signal and transmitting a corresponding color control signal to cause said multi-color light emitting side elements and said multi-color top elements to display a predetermined color and brightness;

wherein said control circuit motion control signal moves said grid of a plurality of elongated bodies to a configuration representing the three dimensional image and said color control circuit causes said multi-color light emitting side elements and said multi-color top elements to emit a color pattern to simulate the coloring of said three dimensional image.

3. A method of displaying a three dimensional image comprising:

(A) providing a three dimensional display system having a plurality of display elements linearly moveable about at least a first axis;

(B) providing a motion controller on said display system for moving at least one of said plurality of display elements;

(C) creating a digital signal of an image to be displayed;

(D) transmitting the digital signal to said display system; providing a motion control circuit on said display system for receiving a digital signal of representation of said image.

* * * * *